No. 696,867. Patented Apr. 1, 1902.
H. F. FULLAGAR.
COMPOUND STEAM TURBINE.
(Application filed Apr. 18, 1901.)
(No Model.) 3 Sheets—Sheet 1.

Witnesses.
William Cross.
Henry A. Brougham.

Inventor.
Hugh Francis Fullagar

No. 696,867. Patented Apr. 1, 1902.
H. F. FULLAGAR.
COMPOUND STEAM TURBINE.
(Application filed Apr. 18, 1901.)
(No Model.) 3 Sheets—Sheet 2.
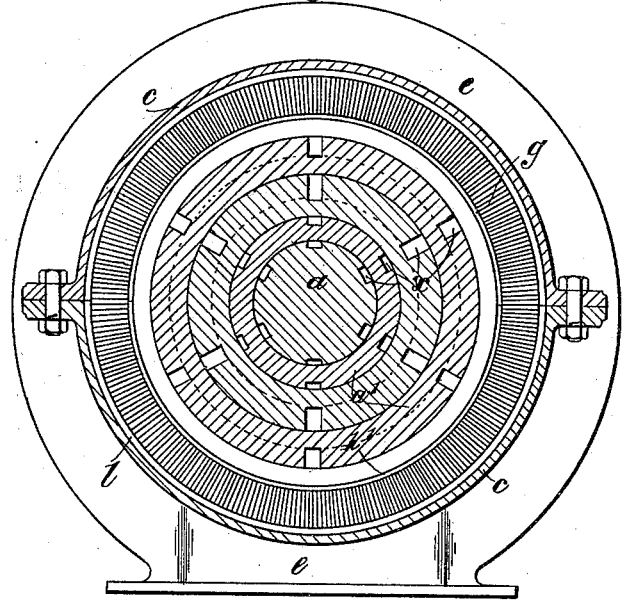
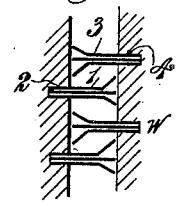
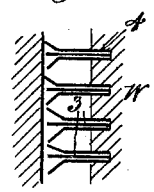
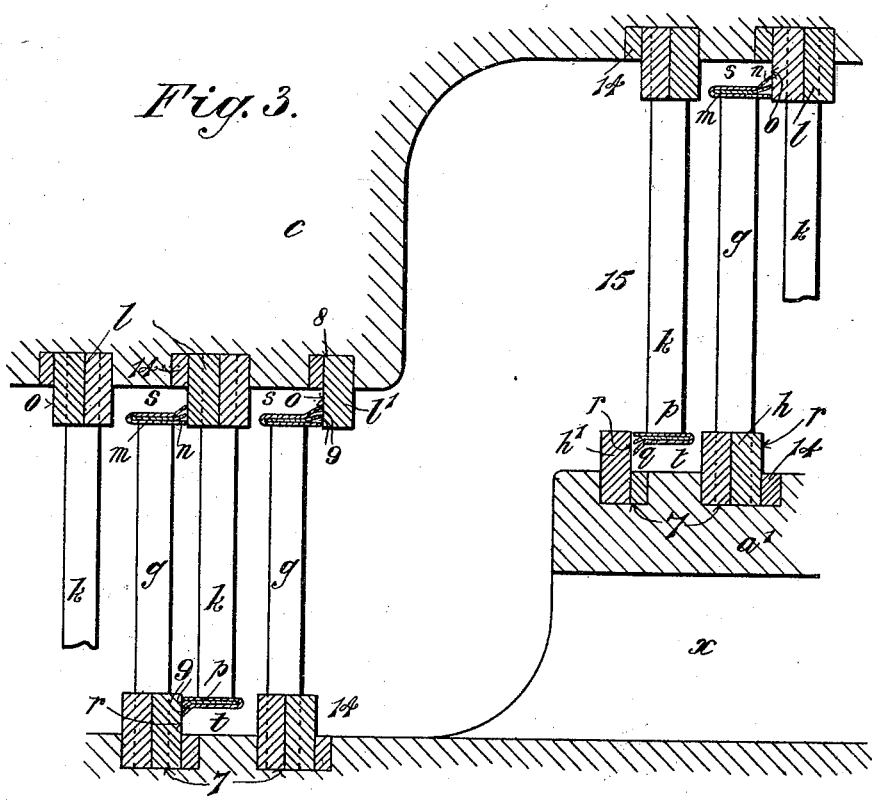
Witnesses
William Cross
Henry A. Brougham
Inventor
Hugh Francis Fullagar No. 696,867. Patented Apr. 1, 1902.
H. F. FULLAGAR.
COMPOUND STEAM TURBINE.
(Application filed Apr. 18, 1901.)
(No Model.) 3 Sheets—Sheet 3.
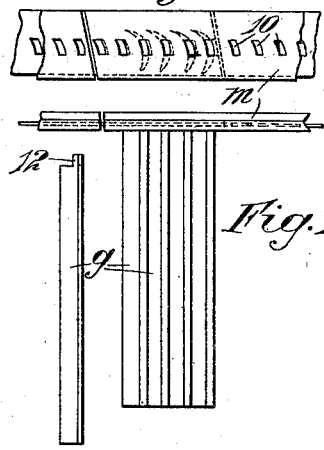
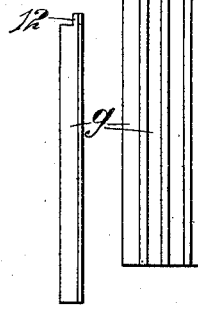
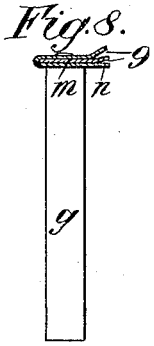
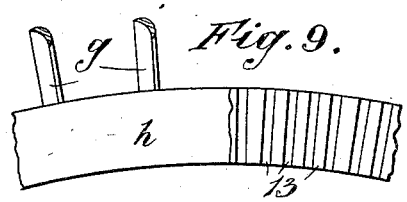
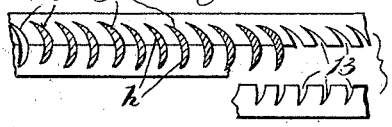
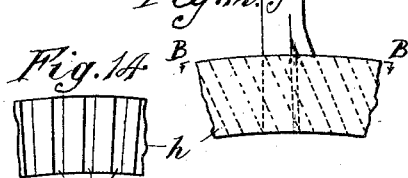
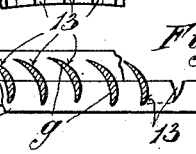
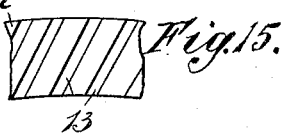
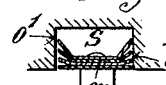
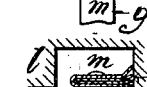
Witnesses.
William Cross.
Henry A. Brougham.
Inventor.
Hugh Francis Fullagar

UNITED STATES PATENT OFFICE.

HUGH FRANCIS FULLAGAR, OF HEATON, NEWCASTLE-UPON-TYNE, ENGLAND.

COMPOUND STEAM-TURBINE.

SPECIFICATION forming part of Letters Patent No. 696,867, dated April 1, 1902.

Application filed April 18, 1901. Serial No. 56,462. (No model.)

*To all whom it may concern:*

Be it known that I, HUGH FRANCIS FULLAGAR, a subject of the King of Great Britain and Ireland, residing at Heaton, Newcastle-upon-Tyne, in the county of Northumberland, England, have invented Improvements in Compound Steam-Turbines and Turbine-Pumps, of which the following is a specification.

This invention has reference primarily to an improved construction of compound steam-turbines and turbine-pumps less delicate and more economical to produce commercially than constructions at present in use.

In compound steam-turbines leakage of steam is liable to occur past the ends of the vanes or blades, which is a serious disadvantage, because not only does the steam that so passes do no effective work, but it issues in a direction that opposes and tends to destroy the properly-directed stream, and thus causes serious waste of power. With a view to obviating this evil axial-flow turbines have been constructed with very small radial clearances between the ends of the vanes or blades and the adjacent spindle and outer casing, respectively—as little, for example, as five-sixths of a millimeter having been commonly allowed to a six-hundred or eight-hundred horse-power turbine with a spindle about three meters long between the bearings. Extreme accuracy of construction has therefore been necessary with the view of insuring that the distortion of the spindle by "whipping" or "whirling" and distortion of the casing due to unequal heating or initial stresses should together not exceed the amount of the clearance. It has been usual, for instance, to plane and bore the casing and then heat it for several hours by steam to relieve initial stresses, to again plane and bore, and sometimes after the blades have been fitted and bored to steam the casing again before fitting in the spindle, the bearings and often the whole length of the casing being scraped to the spindle and its blades with great care. Moreover, in turbines intended to be driven at high angular velocities it is usual to provide a certain radial flexibility in the bearings in order that the spindle may rotate around an axis distant slightly from the geometrical axis, and consequently with constructions heretofore adopted if the bearings be permitted to wear beyond a very slight extent the blades are liable to be worn down and the efficiency of the turbine thus permanently impaired. Like disadvantages obtain with regard to compound turbine-pumps as heretofore constructed.

Now according to this invention, with a view to obviating the above-mentioned disadvantages in a compound elastic-fluid turbine or pump, each ring of vanes or blades is provided with an annular baffler or bafflers, those of the fixed vanes or blades being at their inner ends and close to annular faces carried by the spindle and those of the rotary vanes or blades being at their outer ends and close to annular faces projecting inward from the casing, and ample radial clearance at all parts is provided between the inner ends of the fixed vanes or blades and their bafflers on the one hand and the spindle on the other hand, and also between the outer ends of the rotary vanes or blades and their bafflers on the one hand and the casing on the other hand, the construction being thus such as not only to prevent or greatly reduce leakage past the ends of the vanes or blades, but also to obviate the necessity for extreme accuracy in workmanship and care in use, needful with constructions heretofore adopted, while any leakage that may occur in a radial direction between the bafflers and the adjacent annular faces will not be likely to seriously affect the efficiency of the acting steam.

In compound turbines according to my invention, therefore, the angle which the vanes or blades (hereinafter referred to as "blades") make with the axis can be increased as compared with ordinary practice, or crescent or cup shaped blades may be employed instead of the feather-shaped ones common at present, with the result that fewer rows will be necessary to deal with a given ratio of expansion, and the turbine will become shorter, less liable to distortion from differences of expansion, and cheaper.

Suitable means are provided, such as an adjustable thrust collar or collars in one of the bearings or a separate thrust-block to keep the spindle in place endwise.

In compound steam-turbines for the purpose of counterbalancing end thrust due to pressure of the steam upon the blades and steps of the spindle steam has been caused to act in the opposite direction sometimes upon a second turbine reversely arranged, in other cases on a rotating balance-piston fixed on the turbine-spindle. When, however, complete balancing of the spindle has been aimed at and a large ratio of expansion has had to be provided for, either construction has resulted in a bobbin-shaped spindle and casing, slender in the middle and large in diameter at each end, and whipping or bending of the spindle or casing has been liable to occur and cause the ends to vary from the plane of rotation, thus rendering the small axial clearances at these parts insufficient, besides which the casing has been of a form expensive to make and awkward to use, and, moreover, the spindle has been subject to a considerable tensile stress, in consequence of which it has had either to be made in one piece or of parts strongly and permanently connected.

Now according to my invention, for the purpose of preventing end thrust resulting from pressure of the driving-steam upon the blades and stepped portions of the spindle, there is provided at or near the exhaust end of the casing a fixed disk or wall at a short distance from the annular end face of the enlarged portion of the spindle, and to the intervening space motive fluid is admitted from the inlet end of the casing by symmetrically-arranged longitudinal passages or channels formed in the spindle. Within the said intervening space baffling means are provided.

The invention also consists in further novel features of construction and combinations of parts, all as hereinafter described, and pointed out in the claims.

In the accompanying illustrative drawings, Figure 1 shows, partly in londitudinal section and partly in elevation with the rings of blades removed, a compound steam-turbine constructed according to this invention. Fig. 2 is a cross-section on the line A A of Fig. 1. Fig. 3 shows in longitudinal section part of the spindle and casing at a stepped portion thereof, together with some of the rings of blades and bafflers. Figs. 4 and 5 are part longitudinal sections showing two forms of baffling device. Fig. 6 is a part plan, Fig. 7 a part end view, and Fig. 8 a longitudinal section, showing part of a ring of blades with baffler. Figs. 9 and 10 show in side elevation and plan, respectively, part of one of the rotary rings of blades with a compound holding-ring, a portion of such ring being removed in Fig. 9 and displaced in Fig. 10. Fig. 11 is a perspective view of part of a blade with split root, and Fig. 12 is an end view thereof with part of its compound holding-ring. Fig. 13 is a part sectional plan on the line B B of Fig. 12. Figs. 14 and 15 are views of part of the adjacent notched faces of the two rings constituting the compound holding-ring shown in Figs. 12 and 13. Figs. 16, 17, 18, and 19 are cross-sections showing various forms of annular bafflers. Fig. 20 is a perspective view showing another form.

$a\ a'$ is the rotary turbine-spindle, made of stepped shape and supported at its ends in suitable bearings $b$.

$c$ is the stationary casing, also of stepped shape, in which the spindle rotates, this casing being provided at its smaller end with a steam-inlet passage $d$ and at its larger end with a steam-exhaust passage $e$.

$g$ represents the rotary rings of blades fixed to the spindle $a$ by holding-rings $h$, Figs. 1 and 3, and $k$ represents the stationary rings of blades arranged between the rotary rings of blades $g$ and fixed to the inner surface of the casing $c$ by other holding-rings $l$.

$m$ represents the annular bafflers which according to this invention are fixed to and around the outer ends of the rotary rings of blades $g$ and have their free edges $n$, Fig. 3, arranged in close proximity to but not in actual contact with the adjacent annular lateral faces $o$ of the stationary holding-rings $l$.

$p$ represents the annular bafflers which are fixed to and around the inner ends of the stationary rings of blades $k$ and have their free edges $q$ in close proximity to but not in actual contact with the adjacent annular lateral faces $r$ of the holding-rings $l$.

$h'$ and $l'$ are additional rings fixed to the spindle and casing, respectively, and in proximity to which the ends of the bafflers of the first and last rings of blades in each set terminate.

$s$ represents the spaces between the bafflers $m$ and the interior of the casing, and $t$ represents the spaces between the bafflers $p$ and the spindle. It will be seen that these spaces are of such radial depth as to obviate any liability of the bafflers $m$ and $p$ coming in contact with the casing $c$ and spindle $a\ a'$, respectively, by reason of any whipping of the spindle that may be likely to take place in working. Also it will be seen that by the construction shown the bafflers $m$ and $p$ can be arranged in close proximity to the annular faces $n$ and $r$, so that there will be very little leakage of steam between such parts and that whipping of the spindle and wear of the spindle-bearings are free to take place without materially affecting the relation of the bafflers to the annular faces, in proximity to which they are arranged. At the steam-inlet end of the spindle the clearance between the bafflers $m$ and the adjacent annular faces $n$ may be, for example, about one-twentieth of a millimeter. Toward the exhaust end the clearance may be, for example, about one millimeter.

$v$ is an intermediate space located between the larger end of the stepped portion $a'$ of the spindle and a disk $w$, fixed to the adjacent end wall of the casing $c$ and to which steam is admitted from the inlet end of the casing by symmetrically-arranged longitudinal passages $x$, the outer circumferential portion of the said space $v$ being in communication with the exhaust-passage e. Within the said intermediate space is a baffling arrangement which in the example shown in Fig. 1 comprises concentric rings 1, fixed in concentric annular grooves 2, formed in the annular end face of the enlarged part of the stepped portion a' of the spindle and which rotate between like rings 3 in concentric annular grooves 4, formed in the disk or wall w.

It will be understood that the free edges of the concentric rings 1, fixed on the end of the large part of the spindle, are close to but not in contact with the opposite disk or wall w, and the free edges of the rings 3, carried by that disk or wall, are close to but not in contact with the said end portion of the spindle, so that escape of steam is retarded, and that by suitably varying the number and position of the said rings the balancing pressure of the steam between the end of the large part of the spindle and the disk or wall opposite thereto can be easily adjusted by controlling the fall in pressure as the steam flows from the center toward the exhaust, so that the several stepped portions of the spindle can be placed individually in balance more readily than by means heretofore usually adopted. When a balance-piston has been used for the purpose just mentioned, the effective mean diameter of the several steps in such piston could not be conveniently adjusted, and an approximate end balance has been obtained after repeated trials by the tedious and unsatisfactory process of opening or closing the steam-openings through the rings of vanes or blades in the several parts of the spindle and casing. The said baffling arrangement 1 to 3 in the intermediate space v is intended not only to retard the passage of steam through the said space to the exhaust e, but also to allow of the automatic discharge of water of condensation whether the spindle be rotating or at rest, and thereby to lessen fluid friction and corrosion.

The grooves 2 and 4 instead of being each fitted with a single baffling-ring 1 and 3 may be fitted with a compound or laminated baffling-ring comprising several rings having their free edges splayed apart, as shown in Fig. 4.

Sometimes the concentric rings 1 or 3 may be fixed in concentric grooves formed in one only of the parts mentioned—viz., the spindle a or the disk or wall w, as in Fig. 5, which shows rings 3 fixed to the disk or wall w.

In the example shown the stepped or larger portion of the spindle a a' is built up of a number of superposed sleeves a', Figs. 1 and 2, each formed with suitable longitudinal grooves or channels x, through which steam is allowed free passage to the intermediate space v, the arrangement being such that when the turbine is in use each sleeve a' will be surrounded by steam and therefore in equilibrium, and that each sleeve can be made separately and bladed and finished to gage on an interchangeable system. Such a built-up spindle may comprise, as shown, a central shaft a, provided with suitable steam-packing 5 near each end, a number of sleeves a', the inner one placed upon the shaft, the others one over another, each being successively larger in diameter, but shorter than the one it immediately surrounds, and the whole being attached one to another and to the shaft by keys or similar devices.

Rings of blades g are carried upon the uncovered portions of the sleeves a', and there may also be some upon the inner shaft a when the innermost sleeve does not extend along the whole of the same within the casing, and the compound spindle a a', with its blades g, is surrounded by a casing c, having an internal formation generally resembling the external formation of the compound spindle and having fixed to it the rings of stationary blades k, the arrangement being such that steam admitted to the spindle just within the packing 5 at the inlet end by the passage d will travel through the successive rings of blades g and k to the exhaust-passage e, surrounding one end of the largest sleeve a'.

In carrying out the invention the several parts a' of the compound spindle are turned approximately to size and appropriately grooved, as shown at 7, to receive the rings of blades g. The casing c can be made in halves, as usual, and bored approximately to size and grooved, as shown at 8. In some cases it may be found practicable to dispense with the boring. In some cases also it may be found practicable to cast the casing with the grooves 8.

The bafflers m and p may be laminated ones composed of ribbons of suitable material, such as metal or "fiber," or both, the several thicknesses of which are folded to present successive and separated baffling edges to the fluid, or each baffler may consist of a single ribbon.

In Figs. 1 and 3 each of the bafflers m and p is a laminated one and comprises two metal rings, one of which is of U-section and contains the other, the free edges n and q of the respective sets of concentric rings being splayed apart, so as to form intervening annular spaces 9, that assist in retarding the passage of steam between such edges and the adjacent annular face o or r.

Fig. 16 shows a baffler m composed of two concentric ribbons or rings, the free edges on both sides of which are spaced apart and arranged in proximity to the opposing annular faces o and o' of two adjoining holding-rings l.

Fig. 17 shows a baffler like Fig. 6, but composed of a greater number of concentric rings.

Fig. 18 shows a baffler composed of four thicknesses, made by bending two ribbons or rings each to a U shape, placing one within the other and bending their free ends apart.

Fig. 19 shows a baffler m composed of two sets of rings, each like those shown in Figs.

Figure 1:
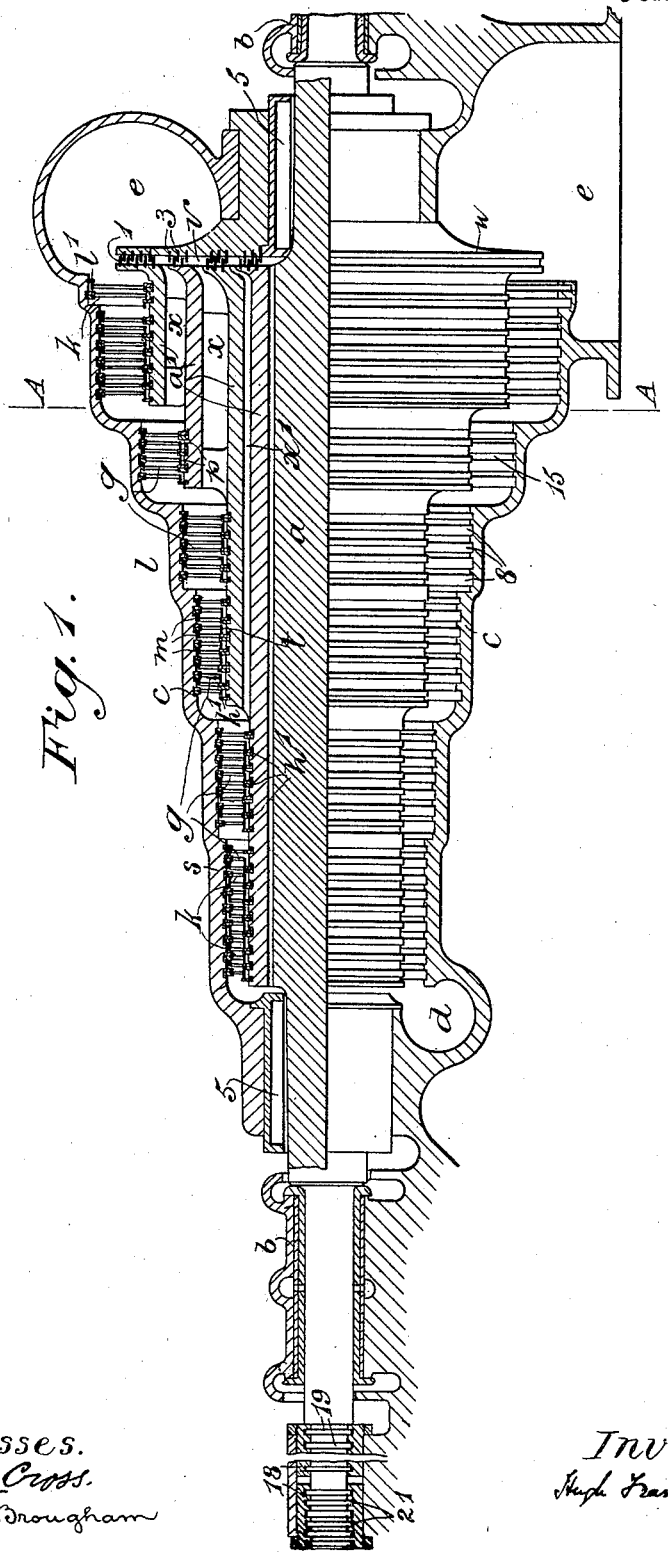

1 and 3, and reversely arranged, so that the free edges are in proximity to the opposing faces $o$ and $o'$ of the adjacent holding-rings $l$.

Fig. 20 shows a baffler $m$ consisting of a single ring. Usually, however, and when the turbine is to be used as a motor it will be desirable in order to get the best results to use a laminated baffler, such as one of those shown in Figs. 1 and 3 and Figs. 16 to 19.

A construction of rings of blades for both spindle and casing is as follows: The thin metal strips to form the bafflers $m$ and $p$ are folded as required and are perforated along their length at intervals corresponding to the positions of the blades $g$ and $k$ by a punching-press, which is provided with rollers to feed the strip, the diameter of one of these rollers being preferably some exact multiple or divisor of the circle to whose form the strip is to be ultimately bent, and such roller being rotated by a ratchet and change wheels in such a manner that an exact number of holes 10, Fig. 6, will be pierced in each portion of strip corresponding to half a circle of baffler. When the bafflers are to be laminated, the several thicknesses may be perforated together or independently, as may be the more convenient. A tenon 12, Fig. 7, is formed at one end of each blade by punching or sawing away the superflous metal. These tenons are inserted in the holes 10 in the baffler, which they exactly fit, and are riveted over either by hand or with the aid of a suitable tool, such as a pneumatic hammer.

To secure the roots of the blades in the grooves 7 or 8 of the spindle $a\ a'$ or casing $c$, as the case may be, two strips, Figs. 9 and 10, of drawn brass or other metal of suitable width, are curved to fit side by side in each of the said grooves. In the adjacent edges of these strips are cut radial notches 13, each set corresponding in number to the blades $g$ or $k$ in each ring, and the notches being so formed, as shown, that when the blades are placed in them and the strips are pressed together the roots of the blades will be thoroughly embedded and firmly held in the strips, about half the width of each blade being in each strip. (See Fig. 10.) Thus the notched strips constitute compound holding-rings $h$ or $l$, and when they have been placed in position in a groove 7 or 8, as shown in Figs. 1 and 3, a calking-strip 14 is also placed therein and is calked in such a manner as to secure the whole in place. The two strips constituting the compound holding-ring $h$ or $l$ are considerably deeper than the groove and project into the annular space 15 between the spindle and casing in such a way as to form therein an annular face in a plane at right angles to the axis of the spindle, which is the face $o$ or $n$, in proximity to which the neighboring baffler $m$ or $p$ is arranged.

Sometimes I prefer to split the root of each blade $g$ and $k$ in a suitable die, bending one part backward or forward, as shown in Figs. 11 and 12, so that the blade will then present four edges by which it will be gripped more securely in the compound ring, Figs. 13, 14, and 15. In this case the notches 13 in one of the strips of the compound ring will be oblique, Fig. 15, instead of radial, Fig. 14. For convenience of insertion into the groove one or both of the notched strips may be cut into comparatively short pieces.

To provide for expansion, the part rings of blades may have their respective portions of baffler constructed to overlap at the junctions, as shown at 16 in Fig. 20. For the same purpose the bafflers may be bent at intervals into U-shaped loops, as shown at 17 in the same figure, or where the bafflers are laminated the respective layers may be in lengths arranged to break joint (see Figs. 6 and 7) to prevent leakage, and the holes 10 therein may be slotted where necessary to allow the strips to move.

18, Fig. 1, is an endwise-adjustable thrust-block of ordinary kind whereby the spindle can be adjusted endwise and held in the required position.

When the spindle $a\ a'$ and casing $c$ have been bladed, the edges $n$ and $q$ of the bafflers $m$ and $p$, respectively, and the annular projecting faces $r$ and $o$ of the compound holding-rings $h$ and $l$, that hold the roots of the blades $g$ and $k$, are faced or turned true in the spindle and in the casing. To facilitate this, I consider it advantageous to make the pitch of the rings of blades uniform throughout the pitch of any thrust-collars 19, Fig. 1, and packing-grooves 21, Fig. 1, and of the spaces between such grooves some exact fraction or multiple of this pitch, so that starting in each case from one end the two halves of the casing $c$, as well as the spindle $a\ a'$, may be separately turned up without drawing or calculation, so that the parts shall correspond without hand-fitting and be interchangeable with the parts of similar turbines.

Turbines constructed as described are equally applicable for use with any elastic fluid, as motors or pumps.

Some of my improvements may be used without the others.

The holding-rings, the opposing end wall of the casing, and the bafflers are preferably made of non-corrosive material—such, for example, as brass or Delta metal—in order to avoid as far as possible any increase in the clearance-space between these parts by corrosion. The casing may be of cast-iron and the spindle of steel.

The bafflers are preferably made of very thin sheet metal—say, for example, rather less than a millimeter thick—so that should they accidentally come in contact with the adjacent holding-rings they will easily wear away to a slight extent at the point or points of contact and not heat and melt and produce a large clearance-space.

As will be understood, turbines constructed as described are lubricated by causing lubricant to continuously flow under pressure through the spindle-bearings, packings, and thrust block or blocks, as heretofore usual; also, when the spindle is to rotate at a very high speed the bearings therefor are made flexible or elastic in a manner well understood.

What I claim is—

1. In a turbine, the combination with the spindle and its casing, of rings of blades fixed to the said spindle, and intermediate rings of blades fixed to the casing, the free ends of each of said rings of blades being connected together and arranged to leave a wide space between those on the spindle and the interior of the casing and between those in the casing and the exterior of the spindle and to form nearly fluid-tight lateral joints with annular surfaces carried by the casing and spindle respectively and thereby cause practically the whole of the motive fluid used to pass through the rings of blades.

2. In a turbine, the combination with the spindle and its casing and rings of blades fixed to said spindle and casing, of annular bafflers fixed to the free ends of the blades, and transversely-arranged annular faces located in the annular space between said spindle and casing and adjacent to which the edges of said bafflers terminate.

3. In a turbine, the combination with the spindle and its casing and rings of blades fixed to said spindle and casing, of annular bafflers fixed to the free ends of the blades, and transversely-arranged annular projections extending outwardly from the spindle and inwardly from the casing and adjacent to the flat faces of which the edges of said bafflers terminate.

4. In a turbine, the combination with the spindle and its casing, of rings of blades fixed at one end to holding-rings fixed to the exterior of the spindle and the interior of the casing and having flat annular lateral faces, and bafflers fixed to the free ends of the rings of blades and arranged adjacent to said annular faces.

5. In a turbine, the combination with the spindle and its casing and rings of blades fixed to said spindle and casing, of annular bafflers fixed to the free ends of the blades so as to leave considerable radial clearance between the bafflers fixed to the inner ends of the fixed blades and the spindle, and between the bafflers fixed to the outer ends of the rotary blades and the interior of the casing, and annular faces carried by the spindle and casing and arranged in close proximity to but out of contact with the bafflers on the fixed and rotary blades respectively, substantially as described for the purpose specified.

6. In a turbine, the combination with a ring of blades fixed at one end to a carrier, of a laminated annular baffler fixed to the other end of the ring of blades and having successive baffling edges, and a transversely-arranged annular face located near to but not in contact with the said edges of the baffler.

7. In a turbine, the combination with a ring of blades fixed at one end to a carrier, of a laminated annular baffler fixed to the other end of the ring of blades and having successive baffling edges spaced apart so as to form one or more annular spaces between them, and a transversely-arranged annular face arranged near to but not in contact with said edges of the baffler.

8. In a turbine, the combination with a ring of blades fixed at one end to a carrier, of an annular baffler fixed to the other end of the ring of blades and having oppositely-arranged baffling edges at its respective sides, and transversely and oppositely arranged annular faces located near to but not in contact with the opposite edges of said baffler.

9. In a turbine, the combination with a ring of blades fixed at one end to a carrier, of a laminated annular baffler fixed to the other end of the ring of blades and having successive baffling edges at each side, and transversely and oppositely arranged annular faces located near to but not in contact with the opposite edges of the said baffler.

10. In a turbine, the combination with the spindle and casing and rings of blades fixed alternately to said spindle and casing, of laminated annular bafflers fixed to the free ends of said rings of blades, and each having two or more superposed baffling edges, and two sets of rings carried by said spindle and casing respectively and having laterally-arranged annular faces arranged near to but not in contact with the superposed edges of said bafflers.

11. In a turbine, the combination with the spindle and casing and rings of blades fixed alternately to said spindle and casing, of laminated annular bafflers fixed to the free ends of said rings of blades and each having two or more superposed baffling edges splayed apart so as to form intervening annular spaces, and two sets of rings carried by said spindle and casing respectively and having laterally-arranged annular faces arranged near to but not in contact with the superposed edges of said bafflers.

12. In a turbine, the combination with the spindle and casing, of rings of blades fixed to said spindle, intermediate rings of blades fixed to said casing, annular bafflers fixed to the free ends of each of said rings of blades and arranged to leave a deep radial space between them and the adjacent part of the casing and spindle respectively, laterally-arranged annular surfaces carried by said spindle and casing and arranged in close proximity to the edges of the bafflers on the fixed and rotary rings of blades respectively, and means for adjusting said spindle with its rings of blades, bafflers and annular surfaces, endwise in relation to the casing and its rings of blades, bafflers and annular surfaces and for holding said spindle endwise.

13. In a turbine, the combination with the spindle and casing, of rings of blades fixed to each of these parts, the free end of each blade being formed with a projection, an annular baffler secured to the projections of each ring of blades so as to close the space between the outer ends of said ring of blades and having one or more baffling edges, and transverse annular surfaces carried by said spindle and casing and located near to but not in contact with the edges of said bafflers.

14. In a turbine, the combination of a stepped spindle and casing arranged one within the other with an annular space between the two, and rings of blades fixed to said spindle and casing and extending into said annular space, of balancing means arranged to act upon the enlarged end of said spindle and force it endwise in an opposite direction to that of the steam flowing through said annular space.

15. In a turbine, the combination of a stepped spindle and casing arranged one within the other so as to leave an intermediate space between the annular end face of the enlarged end of said spindle and the adjacent end wall of said casing, and means for admitting motive fluid to said space for the purpose set forth.

16. In a turbine, the combination of a stepped spindle and casing arranged one within the other so as to leave an annular space between the stepped portions thereof and between the annular end face of the enlarged portion of said spindle and the adjacent end wall of said casing, said spaces being in communication one with another, and rings of blades fixed to said spindle and casing and extending into said annular space.

17. In a turbine, the combination of a stepped and bladed spindle and casing arranged one within the other so as to leave a longitudinal annular space between the stepped portions thereof and also an annular end space between the annular end face of the enlarged portion of said spindle and adjacent end wall of said casing, said casing having an inlet-passage at its smaller end and an exhaust-passage at its larger end, said spindle being formed with symmetrically-arranged longitudinal passages connecting said annular spaces, and said annular end space being in communication with said exhaust-passage, and baffling means arranged in said end space between said longitudinal passages and said exhaust-passage.

18. In a turbine, the combination of a stepped and bladed casing having an inlet-passage at its smaller end and an exhaust-passage at its larger end, a stepped and bladed spindle arranged within said casing so as to form a longitudinal annular space between the stepped portions of the two and an annular end space that is located between the annular end face of the enlarged portion of the spindle and the adjacent end wall of the casing and is in communication at its outer periphery with said exhaust-passage, symmetrically-arranged longitudinal passages formed in said spindle and connecting said longitudinal and end spaces, and a baffling arrangement comprising concentrically-arranged rings located in said end space between said longitudinal passages and said exhaust-passage and carried by one of the walls of said space and terminating near to but not in contact with the opposite end wall of said space.

19. In a turbine, the combination of a stepped and bladed casing having an inlet-passage at its smaller end and an exhaust-passage at its larger end, a stepped and bladed spindle arranged within said casing so as to form a longitudinal annular space between the stepped portions of the two and an annular end space that is located between the annular end face of the enlarged portion of the spindle and the adjacent end wall of the casing and is in communication at its outer periphery with said exhaust-passage, symmetrically-arranged longitudinal passages formed in said spindle and connecting said longitudinal and end spaces, and a baffling arrangement comprising two sets of concentrically-arranged rings located in said end space, one set being carried by the annular end face of the enlarged portion of said spindle and the other set being carried by the opposite end wall of said casing and alternating in position with the rings in the first-mentioned set, said baffling arrangement being arranged between said longitudinal passages and said exhaust-passage.

20. In a turbine, the combination of a stepped and bladed spindle and casing arranged one within the other so as to form a longitudinally-arranged annular working space between the stepped portions thereof, and an annular balancing-space between the larger end of said spindle and the adjacent end of said casing, said balancing-space being in communication at one end with the longitudinal annular space and at the other end with the exhaust-passage leading from said casing, and a baffling device located in said balancing-space and comprising concentrically-arranged laminated rings each fixed at one end to one of the end walls of said balancing-space and having its opposite edges splayed apart and terminating in proximity to the opposite end wall of said space.

21. In a turbine, a stepped and bladed spindle and casing arranged one within the other so as to leave between the larger end of the stepped portion of said spindle and the adjacent end wall of said casing an annular space one of the end walls of which is formed with concentric annular grooves, and baffling-rings fixed in some or all of said grooves.

22. In a turbine, a stepped and bladed spindle and casing arranged one within the other so as to leave between the larger end of the stepped portion of said spindle and the adjacent end wall of said casing, an annular space each of the end walls of which is formed with concentric annular grooves, and baffling-rings fixed in some or all of the grooves in each wall.

23. In a turbine, a stepped spindle comprising a central shaft and a number of sleeves, the inner sleeve being placed on said shaft and the others one over another, each sleeve being successively larger in diameter but shorter than the one it immediately surrounds and the whole of them being attached one to another and to said shaft.

24. In a turbine, a casing having a stepped and bladed interior, a stepped and bladed spindle arranged within said casing so as to form between its stepped portion and the corresponding part of the casing, a longitudinal annular space, and between its larger end and the adjacent end of said casing, an annular space that is in communication with the exhaust-passage from said casing, and a baffling arrangement in said space, the stepped portion of said spindle being built up of a number of superposed sleeves each of which, except the outermost one, is formed with symmetrically-arranged longitudinal grooves or channels connecting the annular space between the stepped portions of said casing and spindle with the annular end space.

25. In a turbine, a ring of blades comprising a number of radially-arranged blades and a compound holding-ring in which the roots of said blades are secured.

26. In a turbine, a ring of blades comprising a number of radially-arranged blades and a compound holding-ring comprising two bent strips of metal arranged side by side and having their adjacent edges formed with notches in which the roots of said blades are fixed.

27. In a turbine, a ring of blades comprising a number of radially-arranged blades each having its root end split and the separate portions thereof bent apart, and a compound holding-ring made of two bent strips of metal having their adjacent edges notched to receive and hold the split ends of the blades.

Signed at 77 Cornhill, London, E. C., this 10th day of April, 1901.

HUGH FRANCIS FULLAGAR.

Witnesses:
WM. O. BROWN,
IRENÈO FRANCO VELHO.